United States Patent
Pelkey et al.

(10) Patent No.: US 10,210,977 B2
(45) Date of Patent: Feb. 19, 2019

(54) VALVE OPERATION BOOSTER

(71) Applicant: Lam Research Corporation, Fremont, CA (US)

(72) Inventors: Devon Pelkey, Tualatin, OR (US); Dirk Rudolph, Dundee, OR (US)

(73) Assignee: Lam Research Corporation, Fremont, CA (US)

( * ) Notice: Subject to any disclaimer, the term of this patent is extended or adjusted under 35 U.S.C. 154(b) by 245 days.

(21) Appl. No.: 15/173,568

(22) Filed: Jun. 3, 2016

(65) Prior Publication Data

US 2017/0352461 A1    Dec. 7, 2017

(51) Int. Cl.
*H01F 7/18* (2006.01)
*H01F 7/06* (2006.01)
*F16K 31/06* (2006.01)
*F02D 41/20* (2006.01)

(52) U.S. Cl.
CPC .......... *H01F 7/064* (2013.01); *F16K 31/0675* (2013.01); *H01F 7/1816* (2013.01); *F02D 41/20* (2013.01); *H01F 7/18* (2013.01); *H01F 2007/1822* (2013.01)

(58) Field of Classification Search
USPC .......................................... 361/139, 144, 160
See application file for complete search history.

(56) References Cited

U.S. PATENT DOCUMENTS

| | | | | |
|---|---|---|---|---|
| 2012/0216783 A1* | 8/2012 | Kusakabe | ............... | F02D 41/20 123/490 |
| 2015/0377176 A1* | 12/2015 | Hatanaka | ............. | F02M 51/061 137/554 |
| 2016/0281624 A1* | 9/2016 | Dames | .................... | F02D 41/40 |

\* cited by examiner

*Primary Examiner* — Danny Nguyen
(74) *Attorney, Agent, or Firm* — Penilla IP, APC

(57) ABSTRACT

A power converter module is connected to an electrical power supply and is configured to generate a first voltage and a second voltage for controlling operation of a valve, where the valve includes a solenoid for affecting opening and closing of the valve. The first voltage is a boost voltage for accelerating opening of the valve. The second voltage is a holding voltage for maintaining the valve in an open state. A boost control module is configured to control supply of the first voltage to the solenoid of the valve in accordance with a first state of an opening boost control signal when a valve control signal directs opening of the valve, and is configured to control supply of the second voltage to the solenoid of the valve in accordance with a second state of the opening boost control signal when the valve control signal directs opening of the valve.

19 Claims, 6 Drawing Sheets

US 10,210,977 B2

VALVE OPERATION BOOSTER

BACKGROUND

1. Field of the Invention

The present invention relates to semiconductor device fabrication.

2. Description of the Related Art

Many modern semiconductor fabrication processes rely upon precise supply of process fluids (gases, liquids, and/or mixed-phase gases and liquids) to a processing region in which the supplied process fluids are used to cause one or more desired effects on a substrate undergoing processing. The precision at which a given process fluid is supplied is a function of flow rate and time. Therefore, it is necessary to control the time or duration over which a given process fluid is supplied to the processing region. Some semiconductor fabrication processes require process fluids to be supplied with a time precision on the order of 10 milliseconds or less. In order to achieve such precise timing of process fluid supply, it is necessary to provide improved systems and methods for controlling operation of process fluid supply valves. It is within this context that the present invention arises.

SUMMARY

In an example embodiment, an apparatus is disclosed for controlling operation of a valve. The valve includes a solenoid for affecting opening and closing of the valve. The apparatus includes a first input terminal for receipt of a valve control signal for directing opening and closing of the valve. The apparatus includes a second input terminal for connection to an electrical power supply. The apparatus includes a power converter module in connection with the second input terminal. The power converter module is configured to generate a first voltage and a second voltage. The first voltage is a boost voltage for accelerating opening of the valve. The second voltage is a holding voltage for maintaining the valve in an open state. The first voltage is greater than the second voltage. The apparatus includes one or both of an opening boost control signal generator defined to generate an opening boost control signal and a third input terminal for receipt of the opening boost control signal. The apparatus also includes an output terminal for connection to the solenoid of the valve. And, the apparatus includes a boost control module configured to supply the first voltage to the output terminal in accordance with a first state of the opening boost control signal when the valve control signal directs opening of the valve. The boost control module is also configured to supply the second voltage to the output terminal in accordance with a second state of the opening boost control signal when the valve control signal directs opening of the valve.

In an example embodiment, a method is disclosed for operating a valve. The valve includes a solenoid for affecting opening and closing of the valve. The method includes receiving a valve control signal. The method includes supplying a first voltage to the solenoid of the valve for a controlled period of time, upon the valve control signal directing opening of the valve. The first voltage is a boost voltage for accelerating opening of the valve. The method includes supplying a second voltage to the solenoid of the valve while the valve control signal continues directing opening of the valve, upon completion of the controlled period of time. The second voltage is supplied in place of the first voltage. The second voltage is a holding voltage for maintaining the valve in an open state. The second voltage is less than the first voltage. The method also includes supplying a third voltage to the solenoid of the valve in place of the second voltage, upon the valve control signal directing closing of the valve. The third voltage is a closing voltage for causing the valve to close.

In an example embodiment, a system is disclosed. The system includes a valve including a solenoid for affecting opening and closing of the valve. The system includes a control system for generating a valve control signal to direct opening and closing of the valve. The system includes a power supply connected to provide electrical power for opening and closing of the valve. The system includes a booster system configured to control supply of electrical voltage to the solenoid of the valve for opening and closing of the valve. The booster system is configured to receive the valve control signal as an input and receive electrical power from the power supply. The booster system is configured to generate a first voltage and a second voltage. The first voltage is a boost voltage for accelerating opening of the valve. The second voltage is a holding voltage for maintaining the valve in an open state. The booster system is configured to either generate or receive an opening boost control signal. The booster system is configured to supply the first voltage to the solenoid of the valve in accordance with a first state of the opening boost control signal when the valve control signal directs opening of the valve. The booster system is configured to supply the second voltage to the solenoid of the valve in accordance with a second state of the opening boost control signal when the valve control signal directs opening of the valve.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
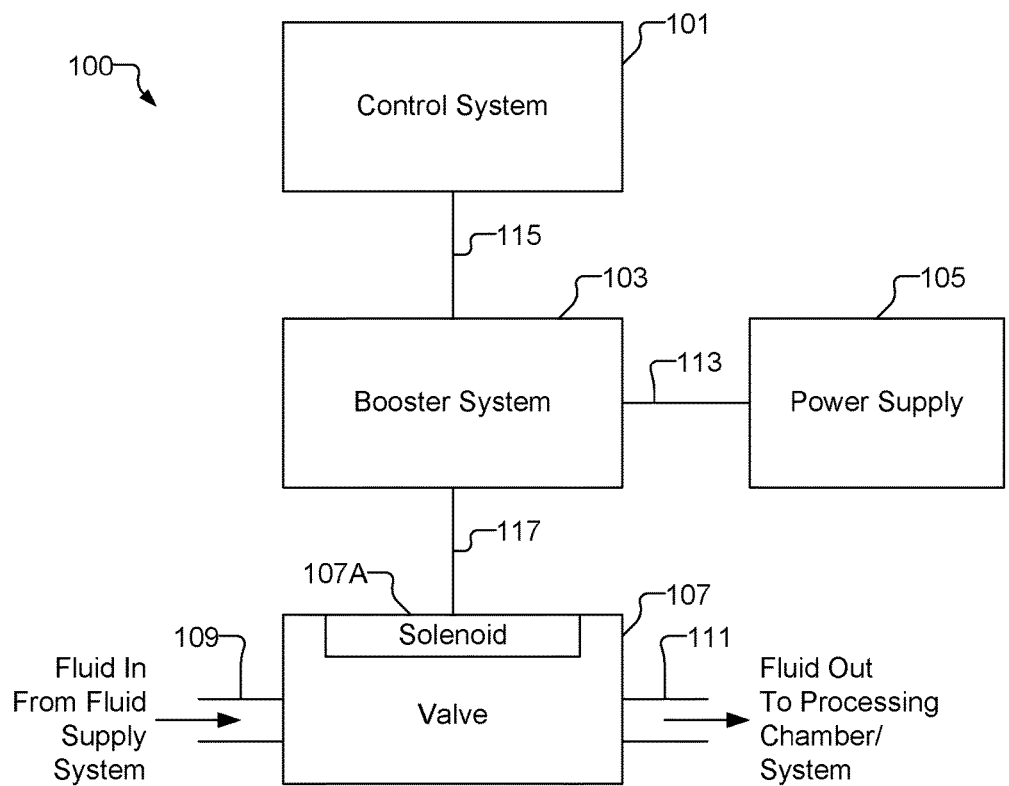
FIG. 1 shows a system for controlling operation a fluid supply valve, in accordance with some example embodiments of the present invention.

FIG. 1 shows a system 100 for controlling operation a fluid supply valve 107, in accordance with some example embodiments of the present invention. The valve 107 includes a solenoid 107A for affecting opening and closing of the valve 107. In various embodiments, the valve 107 can be defined control the flow of gas and/or liquid, in either single phase or mixed phase. The valve includes an input 109 connected to a fluid supply system, such that fluid is supplied to the valve 107 through the input 109. The valve also includes an output 111 through which fluid flows from the valve 107 to a semiconductor processing chamber/system. It should be appreciated that the fluid which flows through the valve 107 can be essentially any type of fluid used in essentially any type of semiconductor fabrication process, with the components of the valve 107 formed of material that is chemically compatible with the fluid. In some embodiments, the solenoid 107A controls pneumatic actuation of a flow control gate within the valve 107. However, it should be understood that the valve 107 can be configured in essentially any manner, so long as actuation of the valve 107, i.e., opening and closing of the valve 107, is controlled by application of a required voltage to the solenoid 107A of the valve 107.

The system 100 includes a control system 101 for generating a valve control signal to direct opening and closing of the valve 107. In various embodiments, the control system 101 can be defined in essentially any manner so long as the control system 101 is defined to generate the valve control signal having a first state to direct opening of the valve 107 and a second state to direct closing of the valve 107. In some embodiments, the first state of the valve control signal to direct opening of the valve 107 is a high digital logic state, and the second state of the valve control signal to direct closing of the valve 107 is a low digital logic state. Also, it should be understood that the control system 101 can be defined to control many different parameters of a given semiconductor fabrication process, with time-sensitive actuation of the valve 107 being one of the many different parameters.

The system 100 also includes a power supply 105 connected to provide electrical power for opening and closing of the valve 107. And, the system 100 includes a booster system 103 configured to control supply of electrical voltage to the solenoid 107A of the valve 107 for opening and closing of the valve 107. The booster system 103 is configured to receive electrical power from the power supply 105 through an electrical connection 113. The booster system 103 is also configured to receive the valve control signal as an input, from the control system 101 through an electrical connection 115.

The booster system 103 is configured to generate a first voltage and a second voltage. The first voltage is a boost voltage for accelerating opening of the valve 107. The second voltage is a holding voltage for maintaining the valve 107 in an open state. The booster system 103 is configured to either generate an opening boost control signal or receive the opening boost control signal as an input. The booster system 103 is configured to supply the first voltage to the solenoid 107A of the valve 107, through an electrical connection 117, in accordance with a first state, e.g., high digital logic state, of the opening boost control signal when the valve control signal directs opening of the valve 107. And, the booster system 103 is configured to supply the second voltage to the solenoid 107A of the valve 107, through the electrical connection 117, in accordance with a second state, e.g., low digital logic state, of the opening boost control signal when the valve control signal directs opening of the valve 107.

Figure 2:
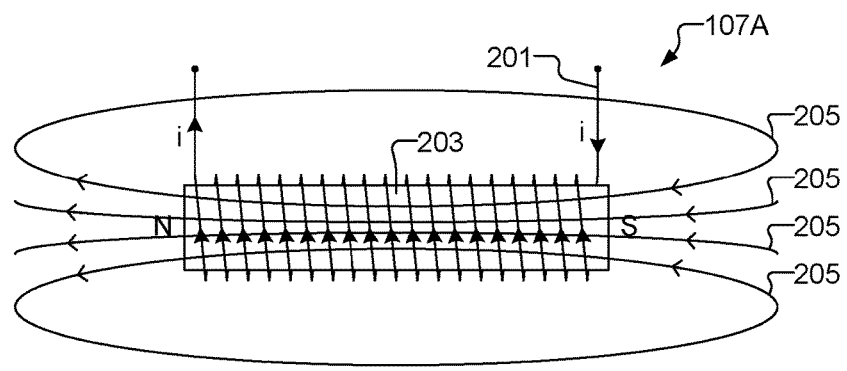
FIG. 2 shows a schematic diagram of a basic solenoid, in accordance with some example embodiments of the present invention.

FIG. 2 shows a schematic diagram of a basic solenoid, which may correspond to the solenoid 107A of the valve 107, in accordance with some example embodiments of the present invention. The solenoid 107A is configured as a coil of wire 201 surrounding a ferromagnetic core 203. When voltage is applied to the coil of wire 201 to cause an electrical current (i) to flow through the coil of wire 201, a magnetic field is generated as shown by the magnetic field lines 205, such that the ferromagnetic core 203 behaves as a bar magnet having an established north pole (N) and an established south pole (S). Magnetization of the ferromagnetic core 203 in accordance with application of the voltage to the coil of wire 201 provides for magnetically-induced actuation of the valve 107 in accordance with application of the voltage to the coil of wire 201. In this manner, supplying a prescribed voltage to the solenoid 107A controls actuation of the valve 107.

In some embodiments, the booster system 103 is configured to generate a third voltage for accelerating closing of the valve 107. In these embodiments, the booster system 103 is configured to either generate a closing boost control signal or receive the closing boost control signal as an input. The booster system 103 is configured to supply the third voltage to the solenoid 107A of the valve 107 in accordance with a first state, e.g., high digital logic state, of the closing boost control signal when the valve control signal directs closing of the valve 107. The booster system 103 is also configured to supply a reference ground voltage to the solenoid 107A of the valve 107 in accordance with a second state, e.g., low digital logic state, of the closing boost control signal when the valve control signal directs closing of the valve 107. In various embodiments, the booster system 103 is implemented using a combination of complementary metal-oxide semiconductor (CMOS) logic gates.

Figure 3:
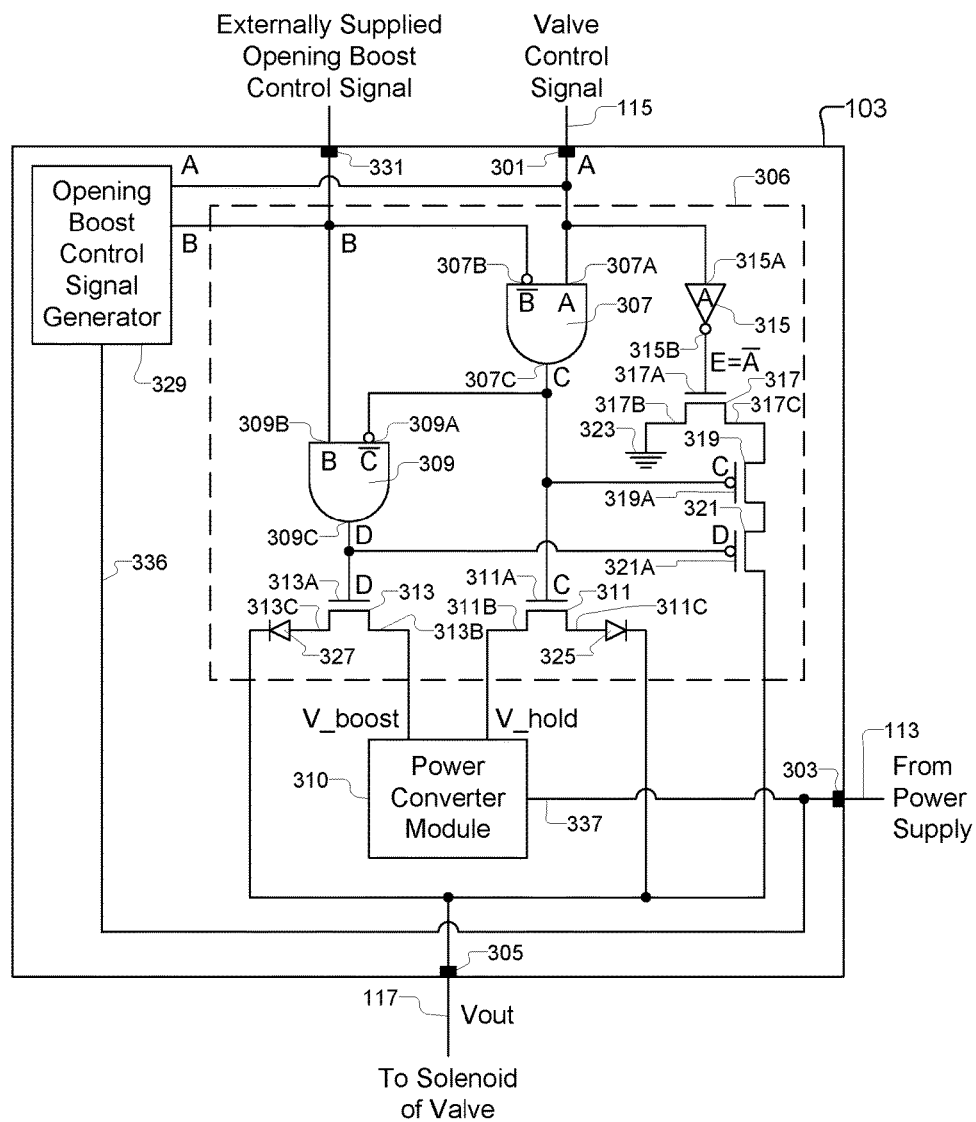
FIG. 3 shows an implementation of the booster system, in accordance with some example embodiments of the present invention.

FIG. 3 shows an implementation of the booster system 103, in accordance with some example embodiments of the present invention. The booster system 103 includes a first input terminal 301 for receipt of the valve control signal from the control system 101 through the electrical connection 115. The valve control signal directs opening and closing of the valve 107. For reference, the valve control signal received at the first input terminal 301 is designated as signal (A). The booster system 103 also includes a second input terminal 303 for connection to the electrical power supply 105 through the electrical connection 113. The booster system 103 also includes a power converter module 310 in connection with the second input terminal 303 through an electrical connection 337, such that electrical power is transmitted from the power supply 105 to the power converter module 310. The power converter module 310 is configured to generate a first voltage (V_boost) and a second voltage (V_hold). The first voltage is a boost voltage (V_boost) for accelerating opening of the valve 107. The second voltage is a holding voltage (V_hold) for maintaining the valve 107 in an open state. The first voltage (V_boost) is greater than the second voltage (V_hold). In some embodiments, the first voltage (V_boost) is greater than a maximum specified voltage for opening of the valve 107, and the second voltage (V_hold) is a nominal specified voltage for opening of the valve 107.

The booster system 103 also includes one or both of an opening boost control signal generator 329 defined to generate an opening boost control signal and a third input terminal 331 for receipt of the opening boost control signal from an external source. For reference, the opening boost control signal is designated as signal (B). The opening boost control signal generator 329 is in connection with the second input terminal 303 through an electrical connection 336, such that electrical power is transmitted from the power supply 105 to the opening boost control signal generator 329.

In some embodiments, the opening boost control signal generator 329 includes a resistor-capacitor (RC) circuit configured to generate the opening boost control signal (B) in accordance with transition of the valve control signal (A). Therefore, in some embodiments, the opening boost control signal generator 329 receives as an input the valve control signal (A). In such embodiments, transition of the valve control signal (A) from a low digital logic state to a high digital logic state triggers transition of the opening boost control signal (B) from a low digital logic state to a high digital logic state. And, upon transition of the opening boost control signal (B) from the low digital logic state to the high digital logic state, the opening boost control signal generator 329 is configured to maintain the opening boost control signal (B) in the high digital logic state for a controlled period of time without regard to the valve control signal (A), with the opening boost control signal (B) transitioning back to the low digital logic state after the controlled period of time.

The booster system 103 includes an output terminal 305 for connection to the solenoid 107A of the valve 107 through the electrical connection 117. The controlled period of time during which the opening boost control signal (B) is asserted, i.e., is in the high digital logic state, sets the period of time over which the first voltage (V_boost) is supplied through the output terminal 305 to the solenoid 107A of the valve 107 as the output voltage (Vout) of the booster system 103. In the embodiments in which the opening boost control signal generator 329 is implemented as the RC circuit, the resistances and capacitances within the RC circuit can be tuned based on operational voltage specifications of the valve 107 in order to set the controlled period of time during which the opening boost control signal (B) is asserted so as to accelerate opening of the valve 107 without electrically damaging the valve 107.

The booster system 103 includes a boost control module 306 configured to supply the first voltage (V_boost) to the output terminal 305 in accordance with a first state, e.g., high digital logic state, of the opening boost control signal (B) when the valve control signal (A) directs opening of the valve 107, such as when the valve control signal (A) has a high digital logic state. The boost control module 306 is also configured to supply the second voltage (V_hold) to the output terminal 305 in accordance with a second state, e.g., low digital logic state, of the opening boost control signal (B) when the valve control signal (A) directs opening of the valve 107, such as when the valve control signal (A) has the high digital logic state.

In the example embodiment of FIG. 3, the boost control module 306 includes a first AND gate 307 having a first input 307A connected to receive the valve control signal (A) and a second input 307B connected to receive an inverted version of the opening boost control signal ($\overline{B}$). The first AND gate 307A provides a first AND output signal (C) at an output 307C. The boost control module includes a second AND gate 309 having a first input 309A connected to receive an inverted version of the first AND output signal ($\overline{C}$) and a second input 309B connected to receive the opening boost control signal (B). The second AND gate 309 provides a second AND output signal (D).

The boost control module 306 also includes a first NMOS transistor 311 having a gate 311A connected to receive the first AND output signal (C) and a first terminal 311B connected to receive the second voltage (V_hold) from the power converter module 310 and a second terminal 311C connected to the output terminal 305. In some embodiments, the boost control module 306 can also include a first diode 325 connected between the second terminal 311C of the first NMOS transistor 311 and the output terminal 305 to prevent flow of electrical current back into the first NMOS transistor 311.

The boost control module 306 also includes a second NMOS transistor 313 having a gate 313A connected to receive the second AND output signal (D) and a first terminal 313B connected to receive the first voltage (V_boost) from the power converter module 310 and a second terminal 313C connected to the output terminal 305. In some embodiments, the boost control module 306 can also include a second diode 327 connected between the second terminal 313C of the second NMOS transistor 313 and the output terminal 305 to prevent flow of electrical current back into the second NMOS transistor 313.

The boost control module 306 can also include an inverter gate 315 having an input 315A connected to receive the valve control signal (A) and an output 315B for providing an inverter output signal (E) as an inverted version of the valve control signal ($\overline{A}$). The boost control module 306 includes a third NMOS transistor 317 having a gate 317A connected to receive the inverter output signal (E) and a first terminal 317B connected to a reference ground potential 323 and a second terminal 317C connected to the output terminal 305. In some embodiments, the boost control module 306 can also include a first PMOS transistor 319 and a second PMOS transistor 321 connected in series between second terminal 317C of the third NMOS transistor 317 and the output terminal 305. The first PMOS transistor 319 has a gate 319A connected to receive the first AND output signal (C). The second PMOS transistor 321 has a gate 321A connected to receive the second AND output signal (D). In this configuration, when the first AND output signal (C) has a high digital logic state, the first PMOS transistor 319 will be off, i.e., in a non-transmit state, and prevent flow of electrical current into the third NMOS transistor 317. Similarly, when the second AND output signal (D) has a high digital logic state, the second PMOS transistor 321 will be off, i.e., in a non-transmit state, and prevent flow of electrical current into the third NMOS transistor 317.

Figure 4:
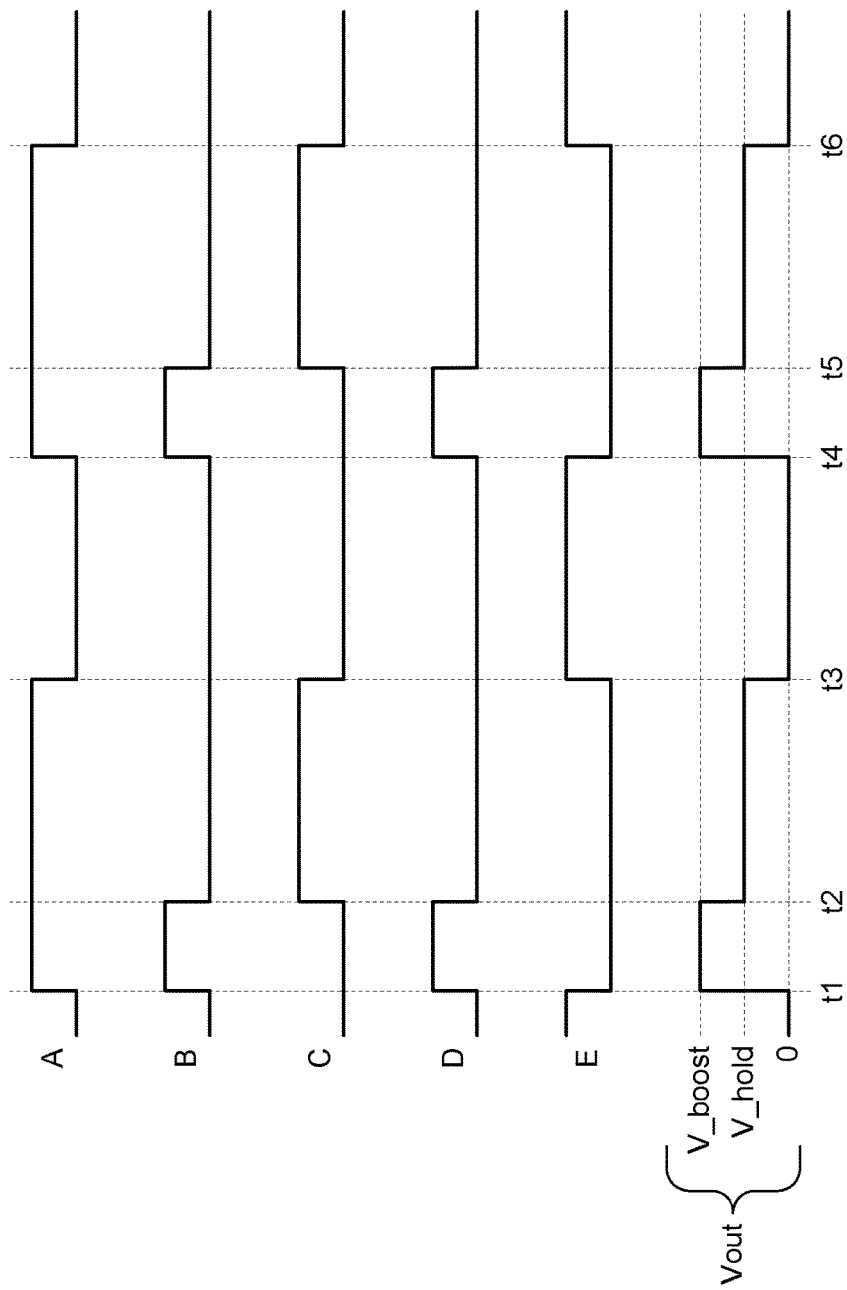
FIG. 4 shows waveforms of various signals present in the booster control module of FIG. 3 as a function of time, in accordance with an example embodiment of the present invention.

FIG. 4 shows waveforms of various signals present in the booster control module 306 of FIG. 3 as a function of time, in accordance with an example embodiment of the present invention. The valve control signal (A) is received at the first input terminal 301, and the opening boost control signal (B) is either received at the third input terminal 331 or is generated by the opening boost control signal generator 329. Each of the first AND output signal (C), the second AND output signal (D) is generated based on a combination of the current states of the valve control signal (A) and the opening boost control signal (B). When the valve control signal (A) is in a high digital logic state and the opening boost control signal (B) is simultaneously in a low digital logic state, the first AND output signal (C) has a high digital logic state; otherwise, the first AND output signal (C) has a low digital logic state. When the opening boost control signal (B) is in a high digital logic state and the first AND output signal (C) is simultaneously in a low digital logic state, the second AND output signal (D) has a high digital logic state; otherwise, the second AND output signal (D) has a low digital logic state. In this manner, the first AND output signal (C) and the second AND output signal (D) will have opposite digital logic states when the valve control signal (A) has a high digital logic state. And, both the first AND output signal (C) and the second AND output signal (D) will have a low digital logic state when the valve control signal (A) has a low digital logic state. The inverter output signal (E) is generated based on the valve control signal (A), such that the inverter output signal (E) has a digital logic state that is opposite of the digital logic state of the valve control signal (A).

The valve control signal (A) is combined with the opening boost control signal (B) to determine when to supply the first voltage (V_boost) to the output terminal 305 (and on to the solenoid 107A of the valve 107) and to determine when to supply the second voltage (V_hold) to the output terminal 305 (and on to the solenoid 107A of the valve 107). As shown in FIG. 4, at time t1, the valve control signal (A) transitions to the high digital logic state, indicating that the valve 107 is to open, which triggers the opening boost control signal (B) to transition to the high digital logic state. With both the valve control signal (A) and the opening boost control signal (B) in the high digital logic state, the second AND output signal (D) is in the high digital logic state and causes the second NMOS transistor 313 to turn on, i.e., transmit, which supplies the first voltage (V_boost) to the output terminal 305 as the output voltage (Vout) of the booster system 103.

The opening boost control signal (B) is defined/generated to maintain the high digital logic state for a controlled period of time (equal to t2 minus t1) to accelerate opening of the valve 107 without causing damage to the valve 107. The controlled period of time is dependent upon the magnitude of the first voltage (V_boost) and the specifications of the valve 107. In various embodiments, the controlled period of time is within a range extending from 0.25 milliseconds (ms) to 100 ms, among other ranges. Also, in some embodiments, the first voltage (V_boost) is a given percentage larger than the specified voltage for opening of the valve 107. In various embodiments, the first voltage (V_boost) is within a range extending from 100 percent to 500 percent of the specified voltage for opening of the valve 107, among other ranges.

After the controlled period of time, i.e., at time t2 in FIG. 4, the opening boost control signal (B) transitions to the low digital logic state, which causes the first AND output signal (C) to transition from the low digital logic state to the high digital logic state, and simultaneously causes the second AND output signal (D) to transition from the high digital logic state to the low digital logic state, and which in turn causes the second NMOS transistor 313 to turn off, i.e., not transmit, and causes the first NMOS transistor 311 to turn on, i.e., transmit, thereby causing the second voltage (V_hold) to be supplied to the output terminal 305 (and on to the solenoid 107A of the valve 107) in place of the first voltage (V_boost). Therefore, when the opening boost control signal (B) transitions to the low digital logic state while the valve control signal (A) is maintained in the high digital logic state, the voltage supplied to the output terminal transitions from the first voltage (V_boost) to the second voltage (V_hold). The second voltage (V_hold) continues to be provided to the output terminal 305 as long as the valve control signal (A) remains in the high digital logic state, which is specified by however long the valve 107 needs to be in the open state (equal to t3 minus t1). Also, the opening boost control signal (B) is defined/generated so that is remains in the low digital logic state until the valve control signal (A) again transitions from the low digital logic state to the high digital logic state, such as at time t4.

At time t3, the valve control signal (A) transitions from the high digital logic state to the low digital logic state, indicating that the valve 107 is to close. Upon transition of the valve control signal (A) to the low digital logic state, the first AND output signal (C) transitions to the low digital logic state, causing the first NMOS transistor 311 to turn off, i.e., not transmit, so that the second voltage (V_hold) is no longer supplied to the output terminal 305. Also, upon transition of the valve control signal (A) to the low digital logic state, the inverter output signal (E) transitions to the high digital logic state causing the third NMOS transistor 317 to turn on, i.e., transmit, to enable connection of the output terminal 305 to the reference ground potential 323. Also, with both the valve control signal (A) and the opening boost control signal (B) in the low digital logic state, both the first AND output signal (C) and the second AND output signal (D) are in the low digital logic state, which causes both of the first PMOS transistor 319 and the second PMOS transistor 321 to turn on, i.e., transmit, thereby allowing connection of the output terminal 305 to the reference ground potential 323 by way of the third NMOS transistor 317. It should be understood, that when the first AND output signal (C) is in the high digital logic state causing the second voltage (V_hold) to be supplied to the output terminal 305, the PMOS transistor 319 is off, thereby preventing flow of electrical current to the third NMOS transistor 317. And, when the second AND output signal (D) is in the high digital logic state causing the first voltage (V_boost) to be supplied to the output terminal 305, the PMOS transistor 321 is off, thereby preventing flow of electrical current to the third NMOS transistor 317. In FIG. 4, times t4, t5, and t6, correspond to a repeat of the operations of times t1, t2, and t3, respectively.

Figure 5:
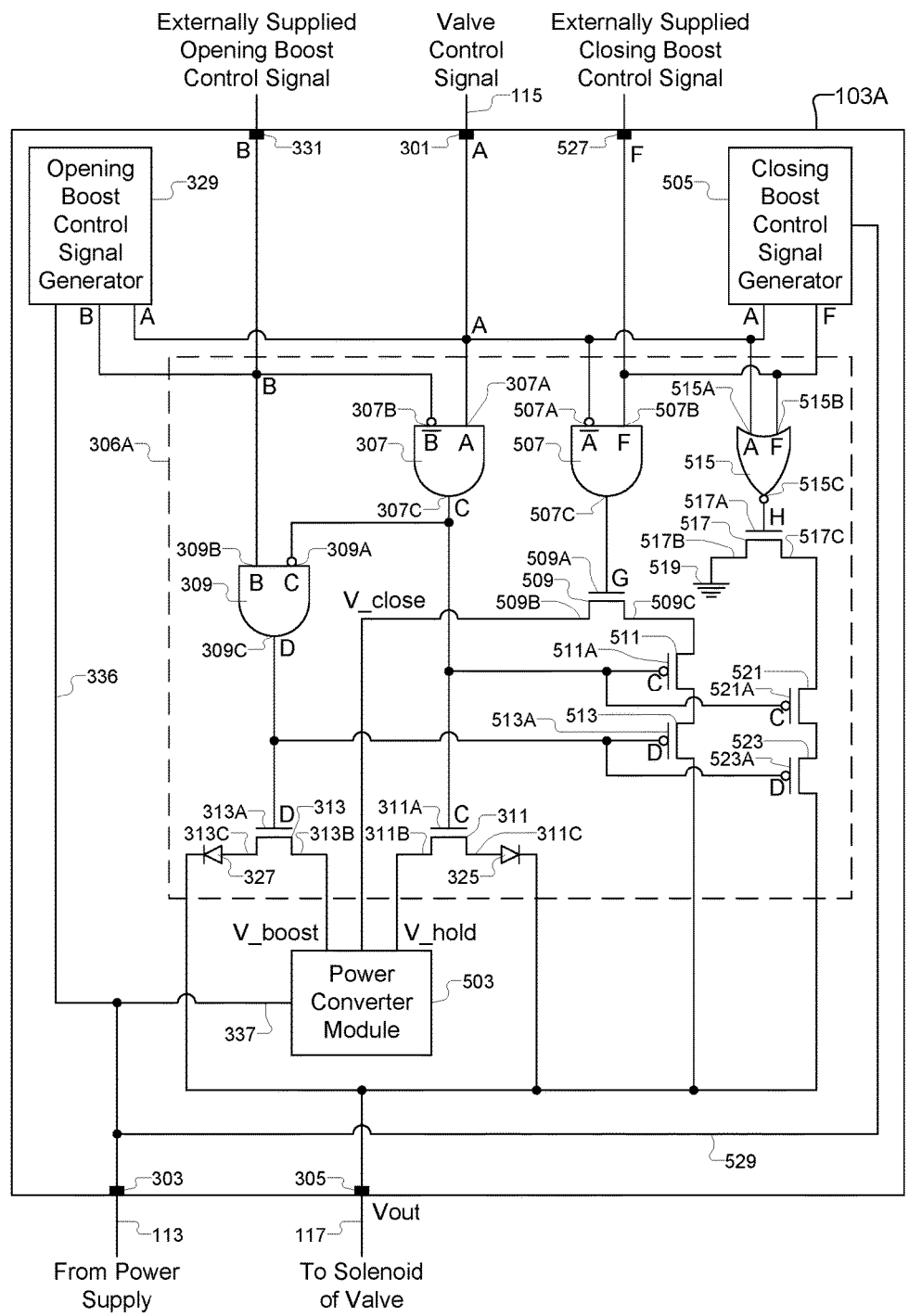
FIG. 5 shows an extended booster system that provides for both accelerated opening and accelerated closing of the valve, in accordance with some example embodiments of the present invention.

FIG. 5 shows an extended booster system 103A that provides for both accelerated opening and accelerated closing of the valve 107, in accordance with some example embodiments of the present invention. The extended booster system 103A includes numerous components of the booster system 103, including the first input terminal 301, the second input terminal 303, one or both of the opening boost control signal generator 329 and the third input terminal 331, and the output terminal 305. The extended booster system 103A includes an extended boost control module 306A that includes the first AND gate 307, the second AND gate 309, the first NMOS transistor 311, and the second NMOS transistor 313. The extended boost control module 306A does not include the inverter gate 315, the third NMOS transistor 317, the first PMOS transistor 319, and the second PMOS transistor 321 as included within the boost control module 306. The extended boost control module 306A includes a modified power converter module 503 configured to generated the first voltage (V_boost), the second voltage (V_hold), and a third voltage (V_close). The third voltage (V_close) is used to accelerate closing of the valve 107.

The extended booster system 103A includes one or both of a closing boost control signal generator 505 defined to generate a closing boost control signal (F) and a fourth input terminal 527 for receipt of the closing boost control signal (F) from an external source. For reference, the closing boost control signal is designated as signal (F). The closing boost control signal generator 505 is in connection with the second input terminal 303 through an electrical connection 529, such that electrical power is transmitted from the power supply 105 to the closing boost control signal generator 505.

In some embodiments, the closing boost control signal generator 505 includes an RC circuit configured to generate the closing boost control signal (F) in accordance with transition of the valve control signal (A). Therefore, in some embodiments, the closing boost control signal generator 505 receives as an input the valve control signal (A). In such embodiments, transition of the valve control signal (A) from a high digital logic state to a low digital logic state triggers transition of the closing boost control signal (F) from a low digital logic state to a high digital logic state. And, upon transition of the closing boost control signal (F) from the low digital logic state to the high digital logic state, the closing boost control signal generator 505 is configured to maintain the closing boost control signal (F) in the high digital logic state for a controlled period of time without regard to the valve control signal (A), with the closing boost control signal (F) transitioning back to the low digital logic state after the controlled period of time.

The extended boost control module 306A is configured to supply the third voltage (V_close) to the output terminal 305 in accordance with a first state, i.e., high digital logic state, of the closing boost control signal (F) when the valve control signal (A) directs closing of the valve 107, i.e., when the valve control signal (A) transitions from the high digital logic state to the low digital logic state. The extended boost control module 306A includes a third AND gate 507 having a first input 507A connected to receive an inverted version of the valve control signal ($\overline{A}$) and a second input 507B connected to receive the closing boost control signal (F). The third AND gate 507 provides a third AND output signal (G) at an output 507C. The extended boost control module 306A also includes a third NMOS transistor 509 having a gate 509A connected to receive the third AND output signal (G) and a first terminal 509B connected to receive the third voltage (V_close) from the modified power converter module 503 and a second terminal 509C connected to the output terminal 305. In some embodiments, the extended boost control module 306A also includes a first PMOS transistor 511 and a second PMOS transistor 513 connected in series between second terminal 509C of the third NMOS transistor 509 and the output terminal 305. The first PMOS transistor 511 has a gate 511A connected to receive the first AND output signal (C). The second PMOS transistor 513 has a gate 513A connected to receive the second AND output signal (D). In this configuration, when the first AND output signal (C) has a high digital logic state, the first PMOS transistor 511 will be off, i.e., in a non-transmit state, and prevent flow of electrical current into the third NMOS transistor 509. Similarly, when the second AND output signal (D) has a high digital logic state, the second PMOS transistor 513 will be off, i.e., in a non-transmit state, and prevent flow of electrical current into the third NMOS transistor 509.

Based on the connectivity of the third AND gate 507, the third NMOS transistor 509, the first PMOS transistor 511, and the second PMOS transistor 513, it should be understood that when the valve control signal (A) transitions to the low digital logic state and the closing boost control signal (F) is in the high digital logic state, the third AND output signal (G) will have a high digital logic state causing the third NMOS transistor to turn on, i.e., transmit. And, with both the first AND output signal (C) and the second AND output signal (D) having the low digital logic state, both the first PMOS transistor 511 and the second PMOS transistor 513 will turn on, i.e., transmit, thereby allowing the third voltage (V_close) to be supplied from the modified power converter module 503 to the output terminal 305 and on to the solenoid 107A of the valve 107.

The extended boost control module 306A also includes a NOR gate 515 having a first input 515A connected to receive the valve control signal (A) and a second input 515B connected to receive the closing boost control signal (F). The NOR gate 515 provides a NOR output signal (H) at an output 515C. When the closing boost control signal (F) transitions to the low digital logic state in conjunction with the valve control signal (A) being in the low digital logic state, the NOR output signal (H) has a high digital logic state; otherwise, the NOR output signal (H) has a low digital logic state. The extended boost control module 306A also includes a fourth NMOS transistor 517 having a gate 517A connected to receive the NOR output signal (H) and a first terminal 517B connected to a reference ground potential 519 and a second terminal 517C connected to the output terminal 305.

In some embodiments, the extended boost control module 306A also includes a third PMOS transistor 521 and a fourth PMOS transistor 523 connected in series between second terminal 517C of the fourth NMOS transistor 517 and the output terminal 305. The third PMOS transistor 521 has a gate 521A connected to receive the first AND output signal (C). The fourth PMOS transistor 523 has a gate 523A connected to receive the second AND output signal (D). In this configuration, when the first AND output signal (C) has a high digital logic state, the third PMOS transistor 521 will be off, i.e., in a non-transmit state, and prevent flow of electrical current into the fourth NMOS transistor 517. Similarly, when the second AND output signal (D) has a high digital logic state, the fourth PMOS transistor 523 will be off, i.e., in a non-transmit state, and prevent flow of electrical current into the fourth NMOS transistor 517.

Based on the connectivity of the NOR gate 515, the fourth NMOS transistor 517, the third PMOS transistor 521, and the fourth PMOS transistor 523, it should be understood that when the closing boost control signal (F) transitions to the low digital logic state with the valve control signal (A) being in the low digital logic state, the NOR output signal (H) will have a high digital logic state causing the fourth NMOS transistor to turn on, i.e., transmit. And, with both the first AND output signal (C) and the second AND output signal (D) having the low digital logic state, both the third PMOS transistor 521 and the fourth PMOS transistor 523 will turn on, i.e., transmit, thereby connecting the output terminal 305 to the reference ground potential 519, and thereby connecting the solenoid 107A of the valve 107 to the reference ground potential 519.

Figure 6:
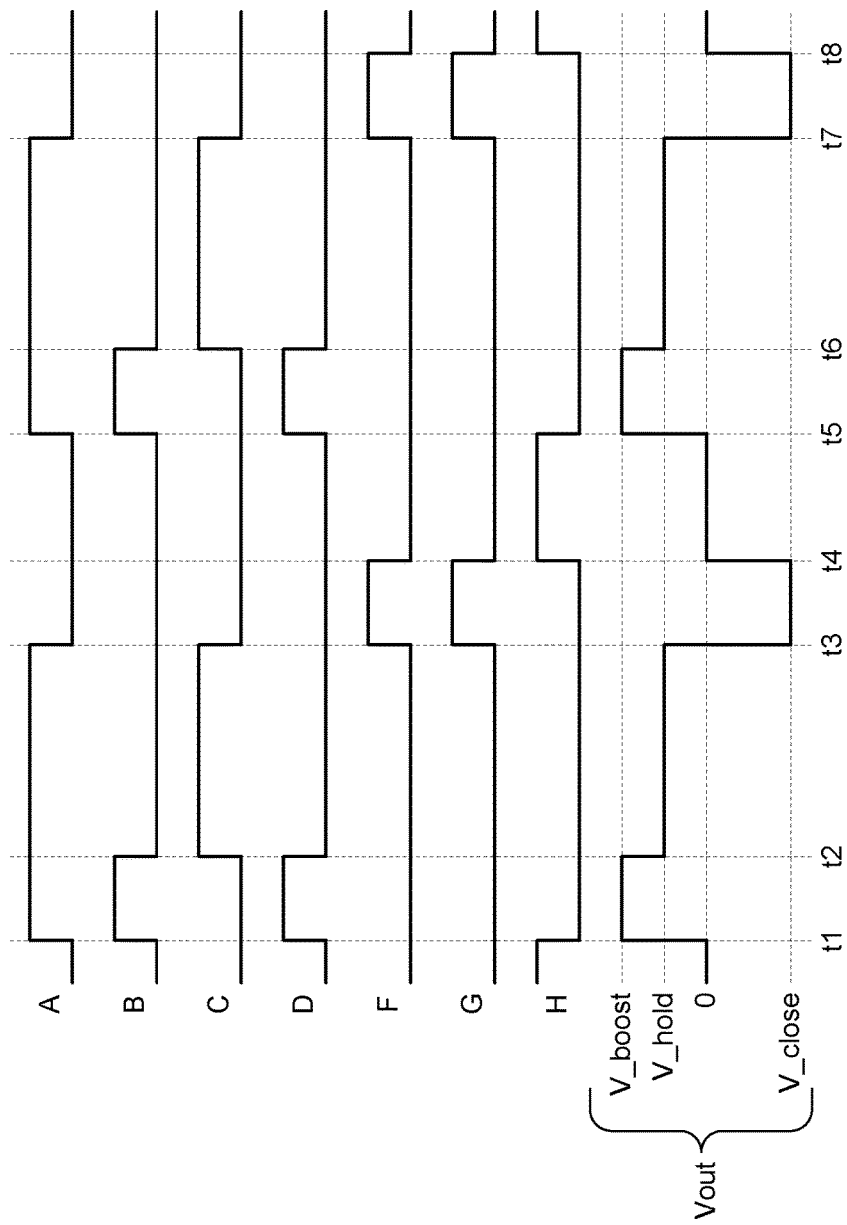
FIG. 6 shows waveforms of various signals present in the extended booster control module of FIG. 5 as a function of time, in accordance with an example embodiment of the present invention.

FIG. 6 shows waveforms of various signals present in the extended booster control module 306A of FIG. 5 as a function of time, in accordance with an example embodiment of the present invention. In FIG. 6, each of the valve control signal (A), opening boost control signal (B), first AND output signal (C), and second AND output signal (D) function in the same manner as described with regard to FIG. 4 to control supply of the first voltage (V_boost) and the second voltage (V_hold) to the output terminal 305 and on to the solenoid 107A of the valve 107. FIG. 6 shows that the closing boost control signal (F) is defined/generated to transition from the low digital logic state to the high digital logic state upon transition of the valve control signal (A) from the high digital logic state to the low digital logic state. Therefore, when the valve control signal (A) transitions to the low logic state to trigger closing of the valve 107, the closing boost control signal (F) transitions to the high digital logic state.

The closing boost control signal (F) is defined/generated to maintain the high digital logic state for a controlled period of time (equal to t4 minus t3) to accelerate closing of the valve 107 without causing damage to the valve 107. The controlled period of time is dependent upon the magnitude of the third voltage (V_close) and the specifications of the valve 107. In various embodiments, the controlled period of time is within a range extending from 0.25 milliseconds (ms) to 100 ms, among other ranges. Also, in some embodiments, the third voltage (V_close) is a negative voltage.

Transition of the closing boost control signal (F) to the high digital logic state in conjunction with the valve control signal being in the low digital logic state causes transition of the third AND output signal (G) to the high digital logic state, which in turn provides for supplying the third voltage (V_close) to the output terminal 305 and on to the solenoid 107A of the valve 107. Then, after the controlled period of time, the closing boost control signal (F) transitions from the high digital logic state to the low digital logic state, which causes the third AND output signal (G) to transition to the low digital logic state, which stops supplying of the third voltage (V_close) to the output terminal 305. Also, when both the closing boost control signal (F) and the valve control signal (A) are in the low digital logic state, the NOR output signal (H) is in the high digital logic state, which turns on the fourth NMOS transistor 517 and connects the output terminal 305 to the reference ground potential 519 until the valve control signal (A) again transitions to the high digital logic state indicating opening of the valve 107, such as shown at time t5. In FIG. 6, times t5, t6, t7, and t8 correspond to a repeat of the operations of times t1, t2, t3, and t4 respectively.

Figure 7:
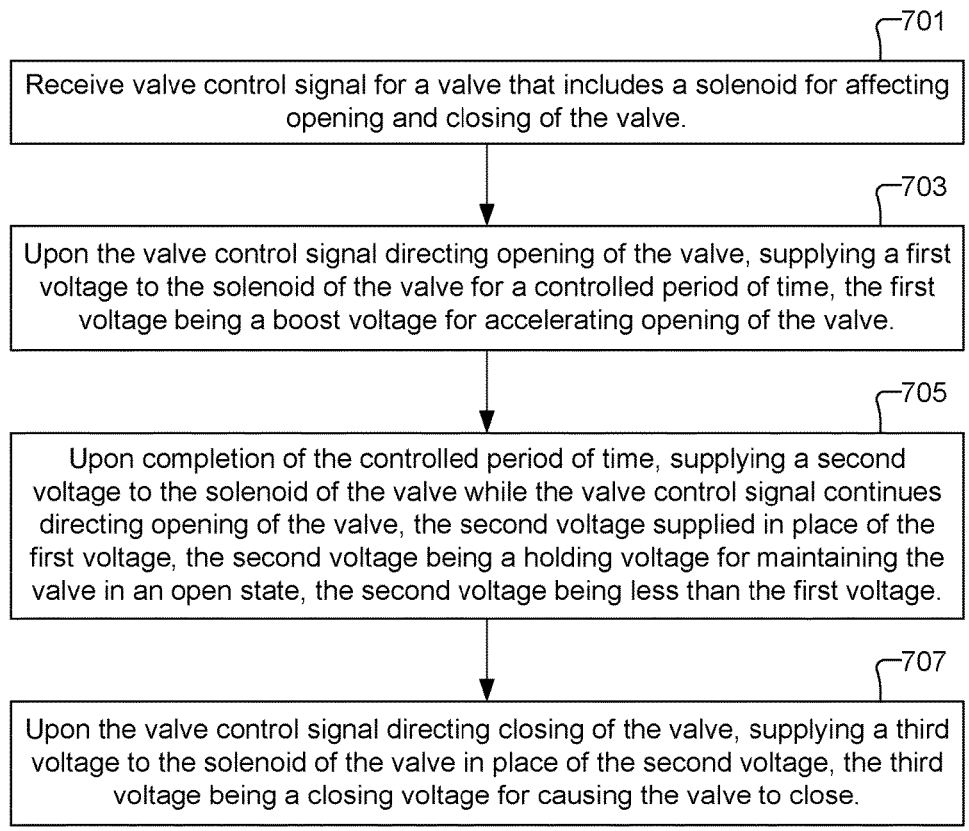
FIG. 7 shows a flowchart of a method for operating a valve, in accordance with some embodiments of the present invention.

FIG. 7 shows a flowchart of a method for operating a valve, in accordance with some embodiments of the present invention. The valve (107) includes a solenoid (107A) for affecting opening and closing of the valve (107). The method includes an operation for receiving a valve control signal (A). Upon the valve control signal (A) directing opening of the valve (107), an operation 703 is performed to supply a first voltage (V_boost) to the solenoid (107A) of the valve (107) for a controlled period of time. The first voltage (V_boost) is a boost voltage for accelerating opening of the valve (107). Upon completion of the controlled period of time, an operation 705 is performed to supply a second voltage (V_hold) to the solenoid (107A) of the valve (107) while the valve control signal (A) continues directing opening of the valve (107). The second voltage (V_hold) is supplied in place of the first voltage (V_boost). The second voltage (V_hold) is a holding voltage for maintaining the valve (107) in an open state. The second voltage (V_hold) is less than the first voltage (V_boost). Upon the valve control signal (A) directing closing of the valve (107), an operation 707 is performed to supply a third voltage (either V_close or reference ground potential) to the solenoid (107A) of the valve (107) in place of the second voltage (V_hold). The third voltage is a closing voltage for causing the valve to close.

In some embodiments, the method includes an operation for generating an opening boost control signal (B) to control both supplying of the first voltage (V_boost) to the solenoid (107A) of the valve (107) and supplying of the second voltage (V_hold) to the solenoid (107A) of the valve (107). The method can also include an operation for combining the opening boost control signal (B) with the valve control signal (A) to determine when to supply the first voltage (V_boost) to the solenoid (107A) of the valve (107) and to determine when to supply the second voltage (V_hold) to the solenoid (107A) of the valve (107). In some embodiments, a high state, i.e., high digital logic state, of the opening boost control signal (B) in combination with a high state of the valve control signal (A) triggers supplying of the first voltage (V_boost) to the solenoid (107A) of the valve (107). And, a low state, i.e., low digital logic state, of the opening boost control signal (B) in combination with the high state of the valve control signal (A) triggers supplying of the second voltage (V_hold) to the solenoid (107A) of the valve (107). And, a low state of the valve control signal (A) directs closing of the valve (107).

In some embodiments, the third voltage is a reference ground voltage. In some embodiments, the third voltage is a closing boost voltage (V_close) for accelerating closing of the valve (107). In some embodiments, the closing boost voltage (V_close) is a negative voltage. The third voltage (V_close) is supplied to the solenoid (107A) of the valve (107) for a second controlled period of time, recalling that the first controlled period of time is for accelerating the opening of the valve (107). The method can also include supplying a fourth voltage to the solenoid (107A) of the valve (107) upon completion of the second controlled period of time while the valve control signal (A) continues directing closing of the valve (107). The fourth voltage is supplied in place of the third voltage (V_close). In some embodiments, the fourth voltage is a reference ground voltage for maintaining the valve (107) in the closed state.

In some embodiments, the method includes generating a closing boost control signal (F) to control both supplying of the third voltage (V_close) to the solenoid (107A) of the valve (107) and supplying of the fourth voltage (reference ground potential) to the solenoid (107A) of the valve (107). The method can also include combining the closing boost control signal (F) with valve control signal (A) to determine when to supply the third voltage (V_close) to the solenoid (107A) of the valve (107) and to determine when to supply the fourth voltage (reference ground potential) to the solenoid (107A) of the valve (107). In some embodiments, a high state, i.e., high digital logic state, of the closing boost control signal (F) in combination with a low state, i.e., low digital logic state, of the valve control signal (A) triggers supplying of the third voltage (V_close) to the solenoid (107A) of the valve (107). And, a low state of the closing boost control signal (F) in combination with the low state of the valve control signal (A) triggers supplying of the fourth voltage (reference ground potential) to the solenoid (107A) of the valve (107).

It should be appreciated that the booster system 103 and extended booster system 103A as disclosed herein provide for a decrease in lag time between when the valve control signal (A) directs opening of the valve 107 and when the valve 107 actually opens. Also, the extended booster system 103A provides for a decrease in lag time between when the valve control signal (A) directs closing of the valve 107 and when the valve 107 actually closes. Some conventional lag times are known to be about 38 milliseconds. With the booster system 103 and/or extended booster system 103A disclosed herein, the lag time can be reduced to less than 10 milliseconds. Each of the booster system 103 and extended booster system 103A can be optimized to provide different voltages and different voltage supply times for accelerating opening (and closing for the extended booster system 103A) of the valve 107, based on the particular characteristics and/or requirements of the valve 107. Also, it should be appreciated that because each of the booster system 103 and extended booster system 103A is implemented using CMOS gates, customization/optimization is possible so that holding voltages and switching times can be appropriately configured for different applications.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. An apparatus for controlling operation of a valve, the valve including a solenoid for affecting opening and closing of the valve, comprising:
   a first input terminal for receiving a valve control signal for directing opening and closing of the valve;
   a second input terminal for connecting to an electrical power supply;
   a power converter module in connection with the second input terminal, the power converter module configured to generate a first voltage and a second voltage, the first voltage being a boost voltage for accelerating opening of the valve, the second voltage being a holding voltage for maintaining the valve in an open state, the first voltage being greater than the second voltage, wherein the first voltage is greater than a maximum specified voltage for opening of the valve;
   one or both of an opening boost control signal generator defined to generate an opening boost control signal and a third input terminal for receipt of the opening boost control signal;
   an output terminal for connection to the solenoid of the valve; and
   a boost control module configured to supply the first voltage to the output terminal in accordance with a first state of the opening boost control signal when the valve control signal directs opening of the valve, the boost control module configured to supply the second voltage to the output terminal in accordance with a second state of the opening boost control signal when the valve control signal directs opening of the valve.

2. The apparatus as recited in claim 1, wherein the opening boost control signal generator includes a resistor-capacitor (RC) circuit configured to generate the opening boost control signal in accordance with transition of the valve control signal.

3. The apparatus as recited in claim 1, wherein the boost control module includes a first AND gate having a first input connected to receive the valve control signal and a second input connected to receive an inverted version of the opening boost control signal, the first AND gate providing a first AND output signal, and
   wherein the boost control module includes a second AND gate having a first input connected to receive an inverted version of the first AND output signal and a second input connected to receive the opening boost control signal, the second AND gate providing a second AND output signal, and
   wherein the boost control module includes a first NMOS transistor having a gate connected to receive the first AND output signal and a first terminal connected to receive the second voltage from the power converter module and a second terminal connected to the output terminal, and
   wherein the boost control module includes a second NMOS transistor having a gate connected to receive the second AND output signal and a first terminal connected to receive the first voltage from the power converter module and a second terminal connected to the output terminal.

4. The apparatus as recited in claim 3, wherein the boost control module includes an inverter gate having an input connected to receive the valve control signal, the inverter gate providing an inverter output signal as an inverted version of the valve control signal, and
   wherein the boost control module includes a third NMOS transistor having a gate connected to receive the inverter output signal and a first terminal connected to a reference ground potential and a second terminal connected to the output terminal.

5. The apparatus as recited in claim 4, wherein the boost control module includes a first diode connected between the second terminal of the first NMOS transistor and the output terminal, and
   wherein the boost control module includes a second diode connected between the second terminal of the second NMOS transistor and the output terminal, and
   wherein the boost control module includes a first PMOS transistor and a second PMOS transistor connected in series between second terminal of the third NMOS transistor and the output terminal, the first PMOS transistor having a gate connected to receive the first AND output signal, the second PMOS transistor having a gate connected to receive the second AND output signal.

6. The apparatus as recited in claim 1, further comprising:
   one or both of a closing boost control signal generator defined to generate a closing boost control signal and a fourth input terminal for receipt of the closing boost control signal,
   wherein the power converter module is configured to generate a third voltage for accelerating closing of the valve,
   wherein the boost control module is configured to supply the third voltage to the output terminal in accordance with a first state of the closing boost control signal when the valve control signal directs closing of the valve.

7. The apparatus as recited in claim 6, wherein the boost control module includes a first AND gate having a first input connected to receive the valve control signal and a second input connected to receive an inverted version of the opening boost control signal, the first AND gate providing a first AND output signal, and
   wherein the boost control module includes a second AND gate having a first input connected to receive an inverted version of the first AND output signal and a second input connected to receive the opening boost control signal, the second AND gate providing a second AND output signal, and
   wherein the boost control module includes a third AND gate having a first input connected to receive an inverted version of the valve control signal and a second input connected to receive the closing boost control signal, the third AND gate providing a third AND output signal, and
   wherein the boost control module includes a first NMOS transistor having a gate connected to receive the first AND output signal and a first terminal connected to receive the second voltage from the power converter module and a second terminal connected to the output terminal, and wherein the boost control module includes a second NMOS transistor having a gate connected to receive the second AND output signal and a first terminal connected to receive the first voltage from the power converter module and a second terminal connected to the output terminal, and wherein the boost control module includes a third NMOS transistor having a gate connected to receive the third AND output signal and a first terminal connected to receive the third voltage from the power converter module and a second terminal connected to the output terminal.

8. The apparatus as recited in claim 7, wherein the boost control module includes a NOR gate having a first input connected to receive the valve control signal and a second input connected to receive the closing boost control signal, the NOR gate providing a NOR output signal, and wherein the boost control module includes a fourth NMOS transistor having a gate connected to receive the NOR output signal and a first terminal connected to a reference ground potential and a second terminal connected to the output terminal.

9. The apparatus as recited in claim 8, wherein the boost control module includes a first diode connected between the second terminal of the first NMOS transistor and the output terminal, and wherein the boost control module includes a second diode connected between the second terminal of the second NMOS transistor and the output terminal, and wherein the boost control module includes a first PMOS transistor and a second PMOS transistor connected in series between second terminal of the third NMOS transistor and the output terminal, the first PMOS transistor having a gate connected to receive the first AND output signal, the second PMOS transistor having a gate connected to receive the second AND output signal, and wherein the boost control module includes a third PMOS transistor and a fourth PMOS transistor connected in series between second terminal of the fourth NMOS transistor and the output terminal, the third PMOS transistor having a gate connected to receive the first AND output signal, the fourth PMOS transistor having a gate connected to receive the second AND output signal.

10. A method for operating a valve, the valve including a solenoid for affecting opening and closing of the valve, comprising:

receiving a valve control signal;

upon the valve control signal directing opening of the valve, supplying a first voltage to the solenoid of the valve for a controlled period of time, the first voltage being a boost voltage for accelerating opening of the valve, the first voltage greater than a maximum specified voltage for opening of the valve;

upon completion of the controlled period of time, supplying a second voltage to the solenoid of the valve while the valve control signal continues directing opening of the valve, the second voltage supplied in place of the first voltage, the second voltage being a holding voltage for maintaining the valve in an open state, the second voltage being less than the first voltage; and upon the valve control signal directing closing of the valve, supplying a third voltage to the solenoid of the valve in place of the second voltage, the third voltage being a closing voltage for causing the valve to close.

11. The method as recited in claim 10, further comprising:

generating an opening boost control signal to control both supplying of the first voltage to the solenoid of the valve and supplying of the second voltage to the solenoid of the valve; and combining the opening boost control signal with the valve control signal to determine when to supply the first voltage to the solenoid of the valve and to determine when to supply the second voltage to the solenoid of the valve.

12. The method as recited in claim 11, wherein a high state of the opening boost control signal in combination with a high state of the valve control signal triggers supplying of the first voltage to the solenoid of the valve, and wherein a low state of the opening boost control signal in combination with the high state of the valve control signal triggers supplying of the second voltage to the solenoid of the valve, and wherein a low state of the valve control signal directs closing of the valve.

13. The method as recited in claim 10, wherein the third voltage is a reference ground voltage.

14. The method as recited in claim 10, wherein the third voltage is a closing boost voltage for accelerating closing of the valve, wherein the third voltage is supplied to the solenoid of the valve for a second controlled period of time, the method further including supplying a fourth voltage to the solenoid of the valve upon completion of the second controlled period of time while the valve control signal continues directing closing of the valve, the fourth voltage supplied in place of the third voltage, the fourth voltage being a reference ground voltage.

15. The method as recited in claim 14, further comprising:

generating a closing boost control signal to control both supplying of the third voltage to the solenoid of the valve and supplying of the fourth voltage to the solenoid of the valve; and combining the closing boost control signal with valve control signal to determine when to supply the third voltage to the solenoid of the valve and to determine when to supply the fourth voltage to the solenoid of the valve.

16. The method as recited in claim 15, wherein a high state of the closing boost control signal in combination with a low state of the valve control signal triggers supplying of the third voltage to the solenoid of the valve, and wherein a low state of the closing boost control signal in combination with the low state of the valve control signal triggers supplying of the fourth voltage to the solenoid of the valve.

17. A system, comprising:

a valve including a solenoid for affecting opening and closing of the valve;

a control system for generating a valve control signal to direct opening and closing of the valve;

a power supply connected to provide electrical power for opening and closing of the valve; and a booster system configured to control supply of electrical voltage to the solenoid of the valve for opening and closing of the valve, the booster system configured to receive the valve control signal as an input and receive electrical power from the power supply, the booster system configured to generate a first voltage and a second voltage, the first voltage being a boost voltage for accelerating opening of the valve, the first voltage greater than a maximum specified voltage for opening of the valve, the second voltage being a holding voltage for maintaining the valve in an open state, the booster system configured to either generate or receive an opening boost control signal, the booster system configured to supply the first voltage to the solenoid of the valve in accordance with a first state of the opening boost control signal when the valve control signal directs opening of the valve, the booster system configured to supply the second voltage to the solenoid of the valve in accordance with a second state of the opening boost control signal when the valve control signal directs opening of the valve.

18. The system as recited in claim 17, wherein the booster system is configured to generate a third voltage for accelerating closing of the valve, and wherein the booster system is configured to either generate or receive a closing boost control signal, the booster system configured to supply the third voltage to the solenoid of the valve in accordance with a first state of the closing boost control signal when the valve control signal directs closing of the valve, the booster system configured to supply a reference ground voltage to the solenoid of the valve in accordance with a second state of the closing boost control signal when the valve control signal directs closing of the valve.

19. The system as recited in claim 18, wherein the booster system is implemented using complementary metal-oxide semiconductor (CMOS) logic gates.

* * * * *